(12) United States Patent
Kobuse (10) Patent No.: US 7,697,021 B2
(45) Date of Patent: Apr. 13, 2010

(54) IMAGE FORMING APPARATUS (75) Inventor: Osamu Kobuse, Saitama-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 12/125,642

(22) Filed: May 22, 2008

(65) Prior Publication Data
US 2008/0218579 A1 Sep. 11, 2008

Related U.S. Application Data (63) Continuation of application No. 11/201,857, filed on Aug. 10, 2005, now Pat. No. 7,379,084.

(51) Int. Cl.
B41J 2/447 (2006.01)
B41J 2/47 (2006.01)
(52) U.S. Cl. ..................... 347/235
(58) Field of Classification Search ............... 347/116, 347/235; 399/301
See application file for complete search history.

(56) References Cited

U.S. PATENT DOCUMENTS 6,704,035 B2 * 3/2004 Kobayashi et al. .......... 347/116
7,379,084 B2 * 5/2008 Kobuse ..................... 347/235

FOREIGN PATENT DOCUMENTS

JP 2004-98299 4/2004
JP 2004-98449 4/2004

* cited by examiner

Primary Examiner—Huan H Tran
(74) Attorney, Agent, or Firm—SoCal IP Law Group LLP; Steven C. Sereboff; John E. Gunther (57) ABSTRACT An image forming apparatus irradiates a polygon mirror with laser beams from different directions. The polygon mirror reflects the laser beams toward different optical axis directions to scan the laser beams at a predetermined deflection angle. First and second beam detectors are disposed at the beam incident ends in the scanning direction of first and second light scanning sections such that the second beam detector detects the start of the light beam scanning operation at an earlier timing than the first beam detector does. The detection result of the first beam detector is used to set sampling start timing in common between first and second image data. Based on the detection results of the first and second beam detectors, first and second image data are written into a memory, and the first and second laser source sections are controlled based on the image data read out from the memory.

8 Claims, 7 Drawing Sheets

IMAGE FORMING APPARATUS

RELATED APPLICATION INFORMATION

This patent is a continuation of application Ser. No. 11/201,857, filed Aug. 10, 2005, entitled IMAGE FORMING APPARATUS.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

The present invention relates to an image forming apparatus such as a copy machine, printer, or fax machine and, more particularly, to a multibeam image forming apparatus that exposes a photoconductor with a plurality of laser beams to form an image.

2. Description of the Related Art

As an example of an apparatus that exposes a photoconductor with a plurality of laser beams to form an image, a multibeam image forming apparatus using a polygon mirror is known. The image forming apparatus generates a plurality of laser beams at a time using the polygon mirror to exposure-scan a photoconductor drum. In forming a color image, the image forming apparatus exposes a plurality of photoconductors spaced apart from one another with a given interval with laser beams and, after development, transfers the color image onto a paper fed by a feeding belt.

In the case where a plurality of laser beams are used to form a color image as described above, exposure scanning operations for respective colors must be synchronized. If the operations are out of synchronization, image distortion, color misalignment, or line misalignment occurs. To cope with this problem, a light sensor (also referred to as BD sensor) that detects a laser beam is disposed at a start position of scanning operation of the polygon mirror for the laser beam to obtain a synchronization signal (Beam Detect signal, also referred to as BD signal) serving as a criterion for starting the scanning operation and writing start timing of laser beam is determined for each color based on the synchronization signal.

Actually, however, displacement of optical elements constituting an optical system, a change in rotation balance resulting from micro vibration of rotator components due to increase in temperature of the polygon mirror, and the like cause the timing detected by the BD sensor to fluctuate, making it difficult to perform an accurate detection. Considering BD signal obtained from a first laser beam as a reference, if the phase of BD signal obtained from a second laser beam is shifted back and forth, the writing start timing of laser beams corresponding to respective colors becomes out of synchronization, causing color misalignment. In some cases, starting positions of scanning operation for photoconductors corresponding to respective colors are shifted by one line each.

An image forming apparatus using a plurality of laser beams that prevents misalignment in the start timing of image exposure is disclosed in Jpn. Pat. Appln. Laid-Open Publication No. 2004-98449.

The image forming apparatus disclosed in the publication detects reference points of line scans of a plurality of laser beams with a light sensor, generates synchronization signals corresponding to respective laser beams, and determines the start timing of image exposure based on the synchronization signals. After that, the image forming apparatus determines one reference synchronization signal from among the synchronization signals and uses a delay means to delay another synchronization signal whose generation timing is close to the reference synchronization signal to make a timing difference between synchronization signals large, thereby determining the start timing of image exposure.

In this example, it is necessary to determine a synchronization signal that is different from the reference synchronization signal and whose generation timing is close to the reference synchronization signal. Further, a delay means is used to make a timing difference large, causing color misalignment in some cases.

Further, Jpn. Pat. Appln. Laid-Open Publication No. 2004-98299 discloses an image forming apparatus using a plurality of laser beams that determines BD signal obtained from a first laser beam as a reference at the time of generation of a horizontal synchronization signal (BD signal), previously measures a phase difference between the reference BD signal and BD signal obtained from another laser beam, and determines the write timing of an image according to the measured phase difference.

In this example, it is necessary to previously measure the phase difference. Further, the phase difference is varied in some cases due to displacement of optical elements constituting an optical system, temperature change, or mechanical micro vibration of a polygon mirror. Thus, the measured phase difference does not always correspond to the estimated value, causing color misalignment in some cases.

DETAILED DESCRIPTION

Throughout this description, the embodiments and examples shown should be considered as exemplars, rather than limitations on the apparatus of the present invention.

An image forming apparatus according to the present invention is applicable to a copy machine, a printer, a fax machine, and so-called an MFP (Multi-Function Peripheral) that combines the functions of theses machines.

Figure 1:
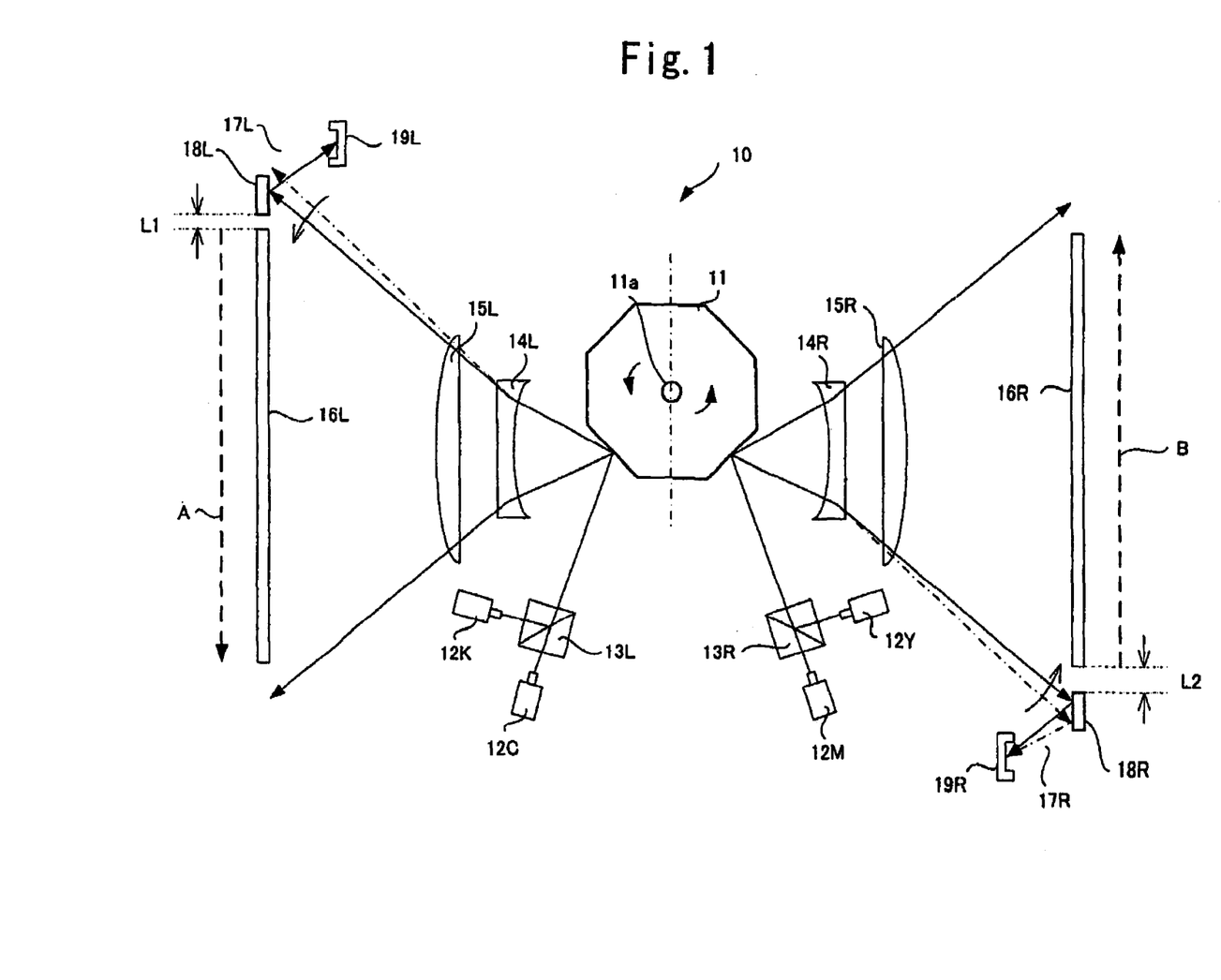
FIG. 1 is a plan view showing a configuration of a light scanning unit of an image forming apparatus according to an embodiment of the present invention.
Figure 2:
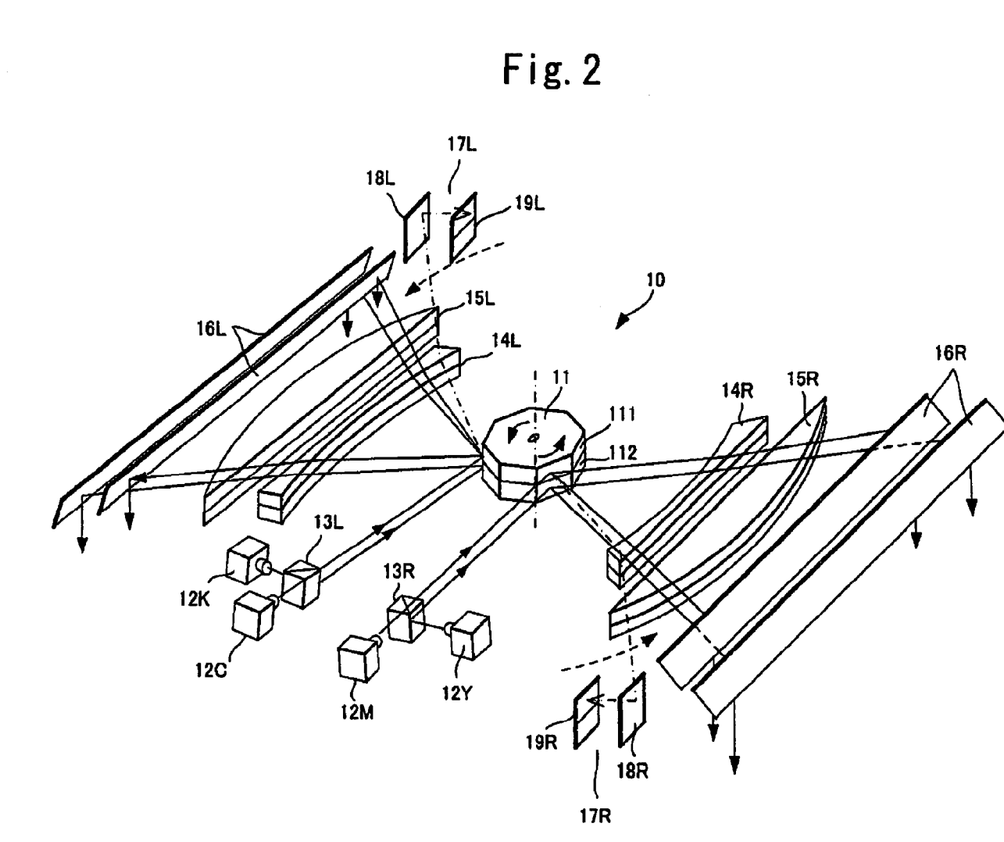
FIG. 2 is a perspective view showing the configuration of the light scanning unit of an image forming apparatus according to the embodiment of the present invention.
Figure 3:
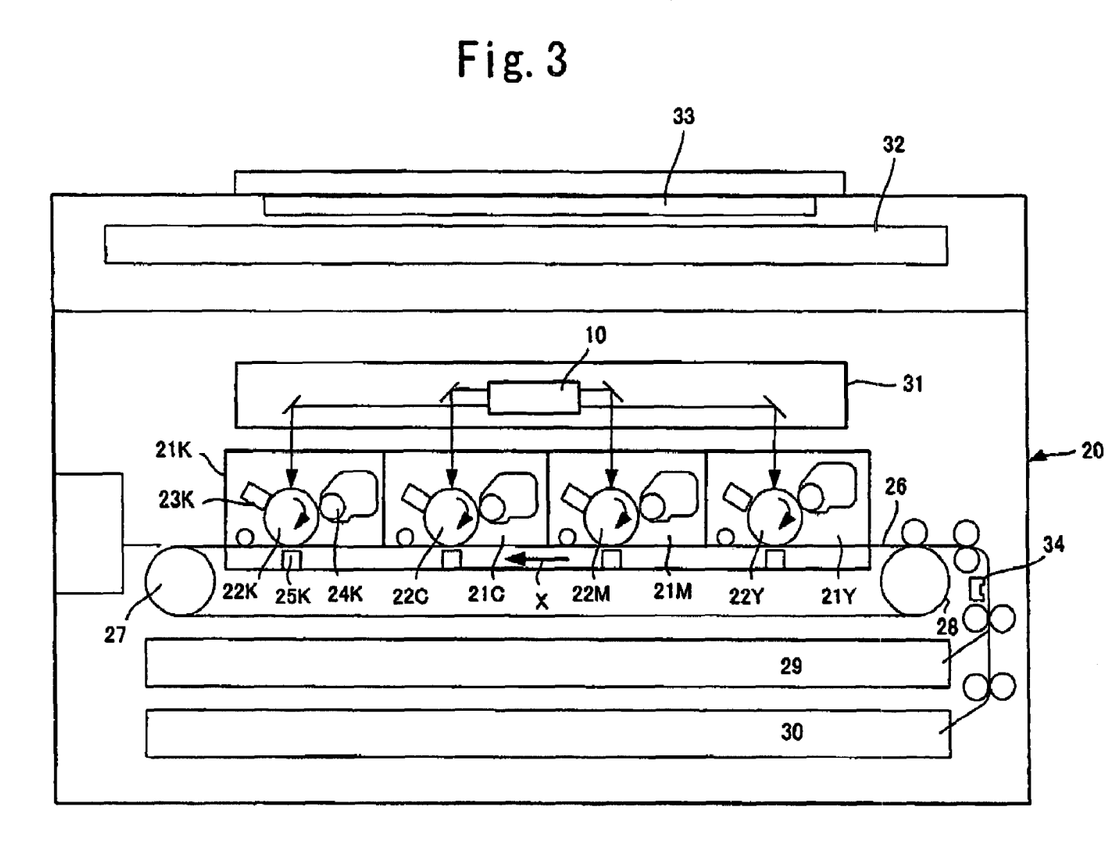
FIG. 3 is an explanatory view showing a configuration of an image forming apparatus using the light scanning unit.

FIG. 1 is a plan view showing a configuration of an optical system of an image forming apparatus according to an embodiment of the present invention, FIG. 2 is a perspective view schematically showing the configuration of the optical system shown in FIG. 1, and FIG. 3 is a view schematically showing an internal configuration of a tandem type color image forming apparatus using the optical system shown in FIGS. 1 and 2.

In FIG. 1, reference numeral 10 is a light scanning unit having a polygon mirror 11 at the center thereof. The polygon mirror 11 is rotated in the counterclockwise direction about a rotation axis 11a. As shown in FIG. 2, the polygon mirror 11 has a two-tier structure constituted by an integrally formed upper mirror 111 and a lower mirror 112, as shown FIG. 2.

A laser beam is projected onto the polygon mirror 11 through first and second light incident paths symmetrically disposed with respect to a plane including the rotation axis 11a of the polygon mirror 11. That is, laser beams emitted from laser sources 12K and 12C are passed through a beam splitter 13L and projected on the polygon mirror 11; similarly, laser beams emitted from laser sources 12Y and 12M are passed through a beam splitter 13R and projected on the polygon mirror 11.

Laser beams emitted from the laser sources 12C and 12K enter the beam splitter 13L and then emitted therefrom in parallel to each other; similarly, laser beams emitted from the laser sources 12M and 12Y are incident on the beam splitter 13R and then emitted therefrom in parallel to each other.

The laser beams emitted from the respective laser sources are passed through the light paths symmetrically running with respect to a plane including the rotation axis 11a of the polygon mirror 11 respectively and enter the polygon mirror 11. The laser beams entering the polygon mirror 11 are then reflected by it. After that, the laser beams from the laser sources 12K and 12C are passed through a first f.theta. lens 14L and a second f.theta. lens 15L respectively, where scan angles of the laser beams are corrected. The laser beams then enter a reflection mirror 16L and folded by it. On the other hand, the laser beams from the laser sources 12Y and 12M are passed through a first f.theta. lens 14R and a second f.theta. lens 15R respectively, enter a reflection mirror 16R and folded by it.

The laser sources 12Y, 12M, 12C, and 12K project laser beams obtained by modulating their output light with image data of Y (yellow), M (magenta), C (cyan), and K (black). As shown in FIG. 2, two laser beams (C, M) are projected onto the upper mirror 111 of the polygon mirror 11 and other two laser beams (K, Y) are projected onto the lower mirror 112. Assuming that a pair of laser beams (K, C) that is projected through one incident path is referred to as first group and a pair of laser beams (Y, M) that is projected through the other incident path is referred to as second group, the laser beams of the first and second groups are reflected by the polygon mirror 11 in symmetrical directions. A rotation of the polygon mirror 11 allows the laser beams of the first and second groups to be scanned in the direction denoted by dotted lines A and B, respectively.

As shown in FIG. 2, the first f.theta. lenses 14L, 14R, second f.theta. lenses 15L, 15R, and reflection mirror 16L, 16R have two-tier structures. The laser beams output from the laser sources C, M are passed through the upper light paths; on the other hand, the laser beams output from the laser sources K, Y are passed through the lower light paths.

Although details will be described later, the laser beams folded by the reflection mirrors 16L, 16R expose photoconductor drums for respective colors (K, C, M, Y) through a not shown optical system (reflection mirror, etc.).

Further, beam detector 17L, 17R are disposed at the portions in the vicinity of the start edges of the scanning operation of the laser beams for the reflection mirrors 16L, 16R, the portion being an overscan region (a region out of the scan region in which the photoconductor drum is exposed for forming an image). The beam detector 17L, which is constituted by a reflection mirror 18L and a light sensor 19L, detects the two laser beams (K, C) of the first group, and the beam detector 17R, which is constituted by a reflection mirror 18R and a light sensor 19R, detects the two laser beams (M, Y) of the second group.

It is possible to generate synchronization signal for synchronizing the laser beams in the main scanning direction by utilizing detection signals (BD signals) from the beam detectors 17L, 17R. Each of the light sensors 19L, 19R has two light detection devices optically and electrically isolated from each other. By the light detection devices, the light sensor 19L independently detects the laser beams K, C, and the light sensor 19R independently detects the laser beams Y, M.

As shown in FIG. 1, the light scanning unit 10 is symmetrically configured with respect to a plane including the rotation axis 11a of the polygon mirror 11. Assuming that the distance between the beam detector 17L and reflection mirror 16L is L1, and distance between the beam detector 17R and reflection mirror 16R is L2, L1 is smaller than L2 (L1<L2).

Assuming that L1=L2 is satisfied, the laser beams enter the reflection mirrors 18L and 18R simultaneously at the time when the polygon mirror 11 is rotated, if manufacturing error is ignored. As a result, the beam detector 17L and beam detector 17R detect the laser beams at the same time.

When L1<L2 is satisfied as described above, the reflection mirror 18R receives the laser beam at an earlier timing than the reflection mirror 18L does at the time when the polygon mirror 11 is rotated, with the result that the beam detector 17R always detects the laser beam earlier than the beam detector 17L does. That is, in the scanning optical system having a symmetrical configuration, only the light sensors 19L and 19R are shifted from the symmetrical position so that the light sensor 19R receives the laser beam at an earlier timing than the light sensor 19L does. The difference between L2 and L1 is determined such that the beam detector 17R always detects the laser beam earlier than the beam detector 17L does in consideration of displacement of the fixed position of optical elements constituting the scanning optical system at the manufacturing time, positional fluctuation of the optical elements due to a change in environmental conditions such as temperature, a change in rotation balance resulting from micro vibration due to increase in temperature of the polygon mirror, and the like.

The positions of the beam detectors 17L and 17R are not limited to the shown example. For example, they may be disposed at the portions in the vicinity of the start edges of the scanning operation of the laser beams for the f.theta. lenses 15L, 15R. Also in this case, the difference between L2 and L1 should be determined such that the beam detector 17R always detects the laser beam earlier than the beam detector 17L does. The reason that the beam detector 17R should detect the laser beam earlier will be described later in the description of circuit operation.

Although the beam splitters 13L, 13R are used to output the two laser beams in parallel to each other, other optical systems such as reflection mirrors may be used in place of the beam splitters.

FIG. 3 schematically shows an internal configuration of a tandem type color image forming apparatus 20 utilizing laser beams folded by the reflection mirrors 16L, 16R. The image forming apparatus 20 has four image forming units 21K, 21C, 21M, 21Y in order to form respective color images of K (black), C (cyan), M (magenta), Y (yellow). The four image forming units are arranged in the moving direction X of a transfer paper. The image forming units 21K, 21C, 21M, 21Y have photoconductor drums 22K, 22C, 22M, 22Y, respectively. The photoconductor drums 22K, 22C, 22M, 22Y are arranged in a line with a predetermined interval along the moving direction X (sub scanning direction) of a transfer paper. The rotation axes of the photoconductor drums 22K, 22C, 22M, 22Y are made parallel to the main scanning direction.

The image forming units 21K, 21C, 21M, 21Y have the same configuration. Here, the configuration of the image forming unit 21K will be described as a representative. The image forming unit 21K includes a charger 23K, a development unit 24K, and a transfer unit 25K, which are disposed around the photoconductor drum 22K. Similarly, the image forming units 21M, 21C, 21Y have the chargers, development units, and transfer units. A feeding belt 26 is wound between a drive roller 27 and a driven roller 28 and is rotated in the direction denoted by the arrow X (sub scanning direction). Paper supply cassettes 29, 30 are provided below the feeding belt 26.

A transfer paper is firstly fed to the image forming unit 21Y, where a yellow image is formed. The surface of the photoconductor drum 22Y is uniformly charged by the charger, exposed by the laser beam output from the laser source 12Y, which has been modulated by the yellow image data, and thereby an electrostatic latent image is formed. The electrostatic latent image formed on the photoconductor drum 22Y is developed by the developing unit and thereby a yellow toner image is formed on the photoconductor drum 22Y. The toner image is transferred onto the transfer paper by the transfer unit at the position (transfer position) where the photoconductor drum 22Y comes into contact with the transfer paper on the feeding roller 26 and thereby yellow image is formed on the transfer paper. After completion of the transfer process, cleaning is applied to the photoconductor drum 22Y to eliminate unnecessary toner remaining on the surface thereof for the next image forming process.

The transfer paper on which yellow image has been transferred in the image forming unit 21Y is fed to the image forming unit 21M by the transfer belt 26. After that, images of magenta, cyan, black are sequentially transferred onto the transfer paper in the same manner. After the transfer of images of four colors has been completed, the transfer paper is separated from the feeding belt 26 and discharged outside the apparatus.

The image forming apparatus 20 further includes a laser exposure unit 31 utilizing laser beam scanning. The laser exposure unit 31 includes the light scanning unit 10 shown in FIGS. 1 and 2 and performs scanning operation in the main scanning direction to irradiate the surfaces of the photoconductor drums 22Y, 22M, 22C, 22K with laser beams for Y, M, C, K.

The image forming apparatus 20 further includes a color scanner section 32. The color scanner section 32 has a transparent document table 33 thereabove. The color scanner section 32 uses an image sensor to read out a color image of the document placed on the document table 33 and converts the image into an electrical signal corresponding to three primary colors of R (red), G (green), B (blue).

The RGB signal is converted into color signals of Y (yellow), M (magenta), C (cyan), K (black), from which image data of C, M, K, Y are generated. The respective laser sources of the laser exposure unit 31 are controlled based on image data of respective colors.

Further, in order to detect a supply state of a paper to be fed from the paper supply cassettes 29, 30, a photosensor 34 that detects the start of the paper supply is provided near the driven roller 28. The photosensor 34 may be disposed at any position as long as it can detect the start of the paper supply.

The laser sources of the laser exposure unit 31 can be controlled by image data created by a personal computer (PC) in addition to the image data obtained by the color scanner section 32.

A configuration of an image processor in the image forming apparatus according to the embodiment of the present invention will next be described.

Figure 4:
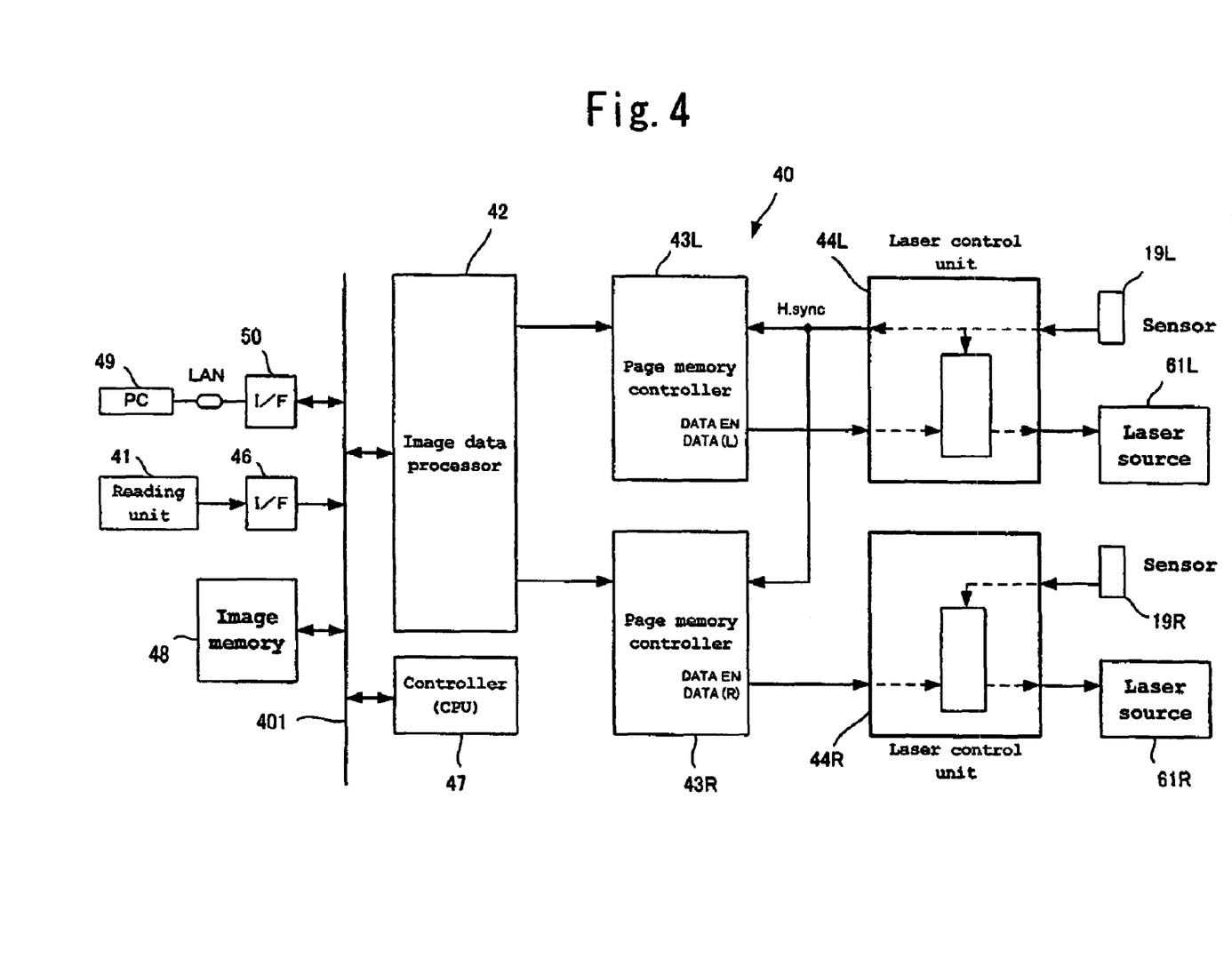
FIG. 4 is a block diagram for explaining an image processor of the image forming apparatus according to the embodiment of the present invention.

FIG. 4 is a block diagram showing a configuration of an image processor 40. The image processor 40 has a reading unit 41 that reads out an image data, an image data processor 42, page memory controllers 43L, 43R, and laser control units 44L, 44R.

Note that the page memory controller 43L and laser control unit 44L are, for example, for cyan (C) or black (K); on the other hand, the page memory controller 43R and laser control unit 44R are, for example, for magenta (M) or yellow (Y). For the shake of brevity, in the following description, the page memory controller 43L and laser control unit 44L are assumed to be units for C or K, and the page memory controller 43R and laser control unit 44R are assumed to be units for M or Y.

The image data from the reading unit 41 is supplied through an I/F 46 to a bus line 401 which is connected to a controller (CPU) 47 and an image memory 48. Further, the image data created by the PC 49 or the like is supplied through a LAN and I/F 50 to the bus line 401.

The laser control units 44L, 44R control the laser sources 61L, 61R. To the laser control units 44L, 44R, detection signals (BD signals) from the light sensors 19L, 19R of the beam detectors 17L, 17R are input.

The reading unit 41, which is constituted by, for example, the color scanner section 32, uses a CCD or the like to photoelectrically convert an image on a document so as to output an RGB image data. The RGB image data is compressed and stored in the image memory 48. When the image data that has been stored in the image memory 48 is printed out, the image data processor 42 expands the compressed image data, performs color space conversion of the RGB image data into a YMCK signal, performs image quality correction such as gamma control or tone correction and, after that, transfers image data of respective colors to the page memory controllers 43L, 43R.

In the block diagram shown in FIG. 4, image data of C (cyan) is output to the page memory controller 43L and image data of M (magenta) is output to the page memory controller 43R, or image data of K (black) is output to the page memory controller 43L and image data of Y (yellow) is output to the page memory controller 43R. The reason for applying the compression to image data when it is stored in the image memory 48 is to effectively utilize the memory. After the data has been read out, the expansion of the data is to be performed.

Image data transferred to the page memory controllers 43L, 43R are pulse-width modulated by the laser control units 44L, 44R, respectively. After that, the pulse-width modulated image data are output to the laser sources 61L, 61R and used for laser control. The laser source 61L corresponds to the laser source 12C or 12K shown in FIGS. 1 and 2, and the laser source 61R corresponds to the laser source 12M or 12Y. The laser beams from the respective laser sources are passed through the optical system shown in FIGS. 1 and 2 and irradiated onto the photoconductor drums 22 of the image forming units 21C, 21M or image forming units 21K, 21Y shown in FIG. 3. The page memory controllers 43L, 43R read out image data in units of page from the image data processor 42 and output the data to the laser control units 44L, 44R based on detection signal BD (L) from the light sensor 19L. That is, the page memory controllers 43L, 43R generate enable signal based on synchronization signal (H sync) which is generated based on detection signal BD (L) and an output of the photosensor 34 that detects the start of the paper supply and transfer image data to the laser control units 44L, 44R.

Figure 5:
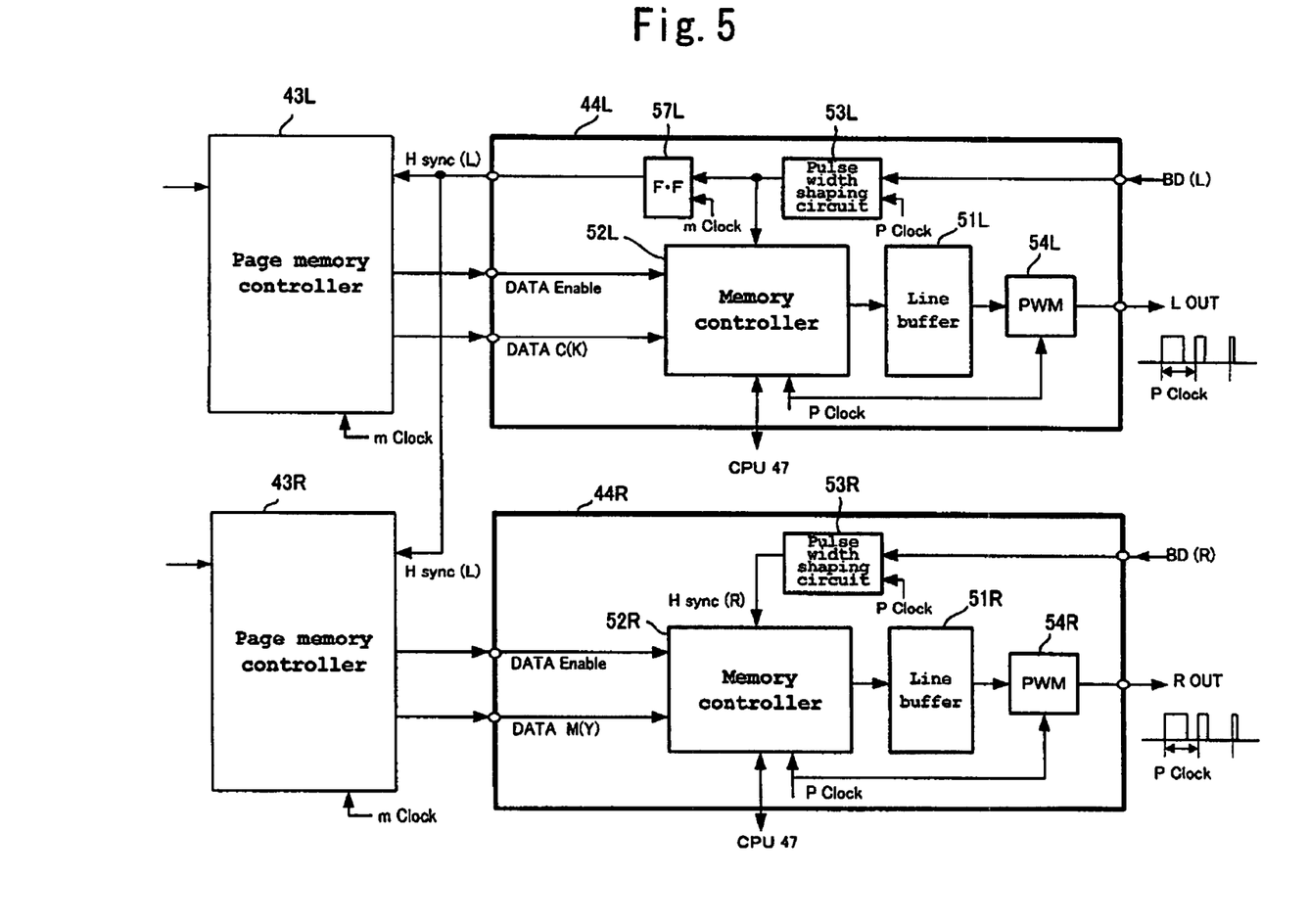
FIG. 5 is a block diagram for mainly explaining a laser controller shown in FIG. 4.

FIG. 5 shows a concrete configuration of the laser control units 44L, 44R. The laser control unit 44L includes a line buffer memory 51L, a memory controller 52L that controls transfer of data to the line buffer memory 51L, a pulse width shaping circuit 53L that receives detection signal BD (L) from the light sensor 19L as an input, and a PWM (Pulse Width Modulation) circuit 54L that pulse-width modulates the data that has been read out from the line buffer memory 51L. In FIG. 5, the laser beams of C (cyan) and K (black) are detected by the sensor 19L, and laser beams of M (magenta) and Y (yellow) is detected by the sensor 19R.

BD (L) signal detected by the light sensor 19L is input to the pulse width shaping circuit 53L, where the signal is shaped into a waveform with a predetermined pulse width and then converted into synchronization signal H sync (L) whose timing is synchronized with the laser control unit 44L. Here, in order to synchronize the timing of synchronization signal H sync (L) with the laser control unit 44L, pulse clock (P clock) to be used in the main part of the laser control unit 44L is input to the pulse width shaping circuit 53L. Subsequently, synchronization signal H sync (L) and main clock signal (m Clock) are input to a flip-flop 57L. Main clock signal (m Clock) is a clock to be used in the page memory controllers 43L, 43R. Synchronization signal H sync (L) whose timing has been readjusted by main clock signal (m Clock) is input to the page memory controllers 43L, 43R. It should be noted that synchronization signal H sync (L) is input not only to the page memory controller 43L, but also to the page memory controller 43R.

Transmission of image data from the image data processor 42 is enabled while synchronization signal H sync (L) is transferred to the page memory controllers 43L, 43R. Enable signal (DATA Enable) is generated in response to the input of synchronization signal H sync (L), and thereby image data is loaded into the memory controller 52L in units of page. As described above, the page memory controllers 43L, 43R operate according to the common main clock signal (m Clock) and are synchronized with synchronization signal H sync (L) generated by the flip-flop 57L.

Further, as described above, the main part of the laser control unit 44L operates according to pulse clock (P clock) and pulse clock (P clock) is supplied to the memory controller 52L and PWM circuit 54L. Further, an image data (DATA C) of C (cyan) is transferred from the page memory controller 43L to the laser control unit 44L.

Enable signal (DATA Enable) to be transferred from the page memory controller 43L and input to the laser control unit 44L becomes High level at the time when image data transfer is not enabled; whereas it becomes Low level at the time when image data transfer is enabled. The memory controller 52L receives Low enable signal that indicates the image data transfer ready condition and reads parallel data corresponding to one page of image data of C by sampling it for each one line. The memory controller 52L converts the read image data into serial data and writes the data corresponding to one line into the line buffer memory 51L.

The memory controller 52L sequentially reads out the image data in the line buffer memory 51L at a predetermined timing according to H sync (L) and transfers the read image data to the PWM circuit 54.

The data writing into the line buffer memory 51L is performed according to L sampling signal synchronized with synchronization signal H sync (L).

The time period in which color image data corresponding to one page is transferred, which is determined based on a paper supply start signal that can be obtained from the photosensor 34 (FIG. 3), corresponds to the exposure time period of image of C.

The PWM circuit 54L performs pulse width modulation in accordance with image data level and supplies the laser source 61L for C (cyan) with a laser control signal. The PWM circuit 54L operates according to pulse clock (P clock) and outputs a signal whose pulse width is changed in accordance to the value of picture element C within each cycle of pulse clock.

The laser control unit 44R has the same configuration as that of the laser control unit 44L. The laser control unit 44R includes a line buffer memory 51R, a memory controller 52R, a pulse width shaping circuit 53R that receives detection signal BD (R) from the light sensor 19R, and a PWM circuit 54R.

The pulse width shaping circuit 53R, to which detection signal BD (R) from the light sensor 19R and pulse clock (P clock) are input, generates synchronization signal H sync (R) that has been shaped into a waveform with a predetermined pulse width in accordance with the generation timing of first clock signal after the input of BD (R) signal. The above point is the same as that in the laser control unit 44L. The laser control unit 44R differs from the laser control unit 44L in the following point.

As described with reference to FIGS. 1 and 2, detection signal BD (R) of the light sensor 19R is allowed to be generated prior to the generation of the detection signal BD (L) of the light sensor 19L. Therefore, the phase of the synchronization signal H sync (R) generated from detection signal BD (R) is advanced relative to that of synchronization signal H sync (L).

Synchronization signal H sync (L) generated by the laser control unit 44L is input to the page memory controller 43R as a reference synchronization signal to enable the image data processor 42 to send, for example, image data of M (magenta) and, subsequently, enable signal (DATA Enable) is supplied from the page memory controller 43R to the memory controller 52R of the laser control unit 44R. Further, pulse clock signal (P clock) is supplied to the memory controller 52R and, at the same time, image data of M (DATA M) is loaded thereinto.

The memory controller 52R of the laser control unit 44R receives enable signal of image forming instruction level (Low) from the page memory controller 43R, reads parallel data corresponding to one page of image data of M by sampling it, converts the read data into serial data, and writes the data corresponding to one line into the line buffer memory 51R. At the same time, the memory controller 52R sequentially reads out the image data in the line buffer memory 51R at a predetermined timing according to H sync (R) and transfers the read image data to the PWM circuit 54R. The data writing into the line buffer memory 51R is performed according to R sampling signal synchronized with synchronization signal H sync (R).

Although the time period in which image data of M corresponding to one page is written into the laser control unit 44R is the same as that in which image data of C corresponding to one page is written into the laser control unit 44L, the timing between the above two writing operation is different. The time period in which color image data corresponding to one page is transferred corresponds to the exposure time period of image of M.

Image data of K (black) is processed using the same circuits in the page memory controller 43L and laser control unit 44L. Image data of Y (yellow) is processed using the same circuits in the page memory controller 43R and laser control unit 44R.

Figure 6:
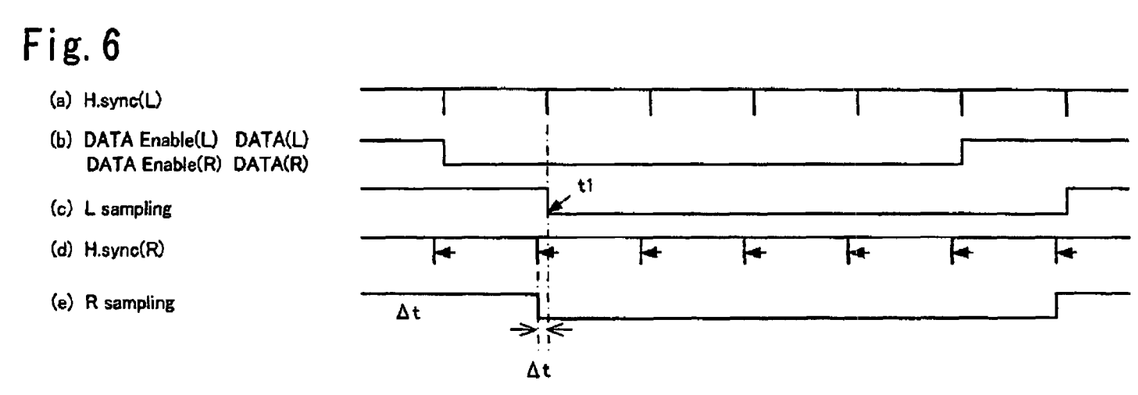
FIGS. 6(a) to 6(e) are timing chart for explaining operation of a synchronization system in the image forming apparatus according to the present invention.

An operation of the image forming apparatus of FIG. 5 according to the embodiment of the present invention will next be described with reference to FIG. 6. Logic signal in FIG. 6 is Low and active state.

The waveform shown in FIG. 6(a) represents synchronization signal H sync (L) generated from detection signal BD (L) of the light sensor 19L. The waveform of FIG. 6(b) represents enable signal (DATA Enable) to be output from the page memory controller 43L and input to the memory controller 52L. Further, FIG. 6(c) represents sampling time period L sampling in which the memory controller 52L of the laser control unit 44L reads image data.

FIG. 6(d) represents synchronization signal H sync (R), which has been obtained in the laser control unit 44R based on detection signal BD (R) from the sensor 19R, and FIG. 6(e) represents sampling time period R sampling in which the memory controller 52R of the laser control unit 44R reads image data.

As shown in FIG. 6(b), enable signal (DATA Enable) from the memory controller 43L is generated in response to generation of synchronization signal H sync (L) of FIG. 6(a). Image data (DATA L) and (DATA R) from the page memory controllers 43L, 43R are output to the laser control units 44L and 44R at the same timing as enable signal (DATA Enable).

The time period during which enable signal (DATA Enable) assumes High level is time period during which transfer of image data from the page memory controller is masked. When enable signal becomes Low level, image data can be transferred. When first synchronization signal H sync (L) is received after enable signal (DATA Enable) has become Low level, sampling of image data DATA (L) is started at timing t1 of FIG. 6(c) and data writing into the line buffer memory 51L is performed.

The sensor 19R for the laser control unit 44R always detects a laser beam at an earlier timing than the sensor 19L for the laser control unit 44L does, so that synchronization signal H sync (R) is generated prior to synchronization signal H sync (L) as shown in FIG. 6(d).

Therefore, as shown in FIG. 6(e), image data sampling time period R sampling in the memory controller 52R precedes L sampling of FIG. 6(c) by time .DELTA.t. Sampling of image data DATA (R) from the page memory controller 43R is thus started and data writing into the line buffer memory 51R is performed.

Figure 7:
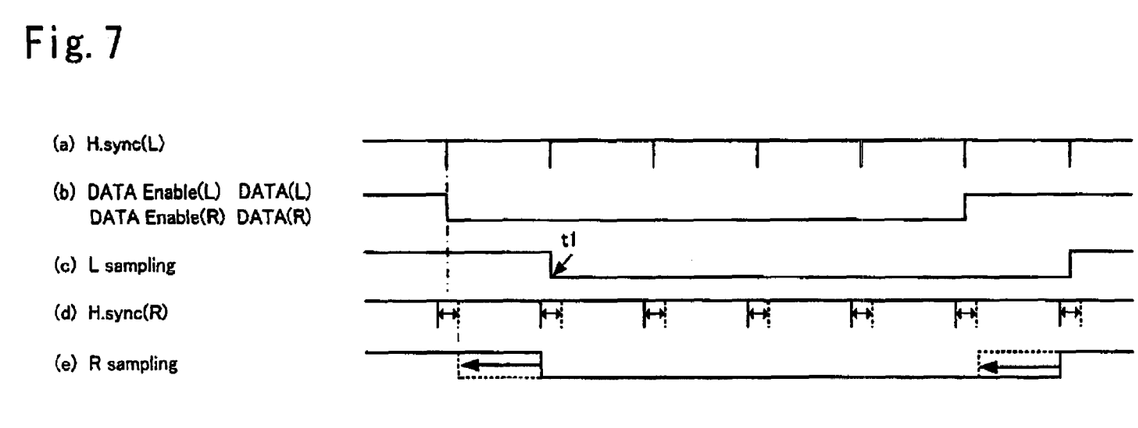
FIGS. 7(a) to 7(e) are timing chart for explaining operation of a synchronization system in a general type image forming apparatus.

FIG. 7 is a timing chart for explaining operation of an image forming apparatus of a conventional general type, in which beam detectors 17L, 17R detect laser beams at the same timing. In this case, there is no problem if BD (L), BD (R) are always generated at the same time. However, due to assembly error of the optical system, whether BD (L) or BD (R) is generated first is uncertain. Further, the rotation balance of the polygon mirror is changed by micro vibration of components constituting a rotator due to increase in temperature of the polygon mirror, which may fluctuate detection timing of the BD sensor in some cases.

That is, assuming that sampling time period is set based on one synchronization signal, for example, H sync (L), if the phase of synchronization signal H sync (R) is advanced relative to synchronization signal H sync (L) as shown in FIG. 7(d), R sampling is slightly out of phase with L sampling as denoted by the solid line in FIG. 7(e). On the other hand, if the phase of synchronization signal H sync (R) is retarded relative to synchronization signal H sync (.DELTA.L), R sampling is advanced relative to L sampling by as much as about one line as denoted by the dotted line in FIG. 7(e). The shift between scanning positions of the first and second laser beams makes color blurring noticeable on a printed out image.

According to the present invention, even if the sampling time period is set based on one synchronization signal, for example, H sync (L), it is possible to eliminate the above problem by allowing the detection of the sensor 19R to precede the detection of the sensor 19L. Therefore, it is possible to prevent image degradation due to shift in the data write start timing.

Another embodiment of the image forming apparatus according to the present invention will be described below with reference to FIG. 8. In the above embodiment, synchronization signal H sync (R) is allowed to be generated prior to the generation of H sync (L) by positional relationship between the BD sensors 17L, 17R, that is, mechanical structure. On the other hand, in FIG. 8, synchronization signal H sync (R) is allowed to be generated prior to the generation of H sync (L) by electrical processing.

Figure 8:
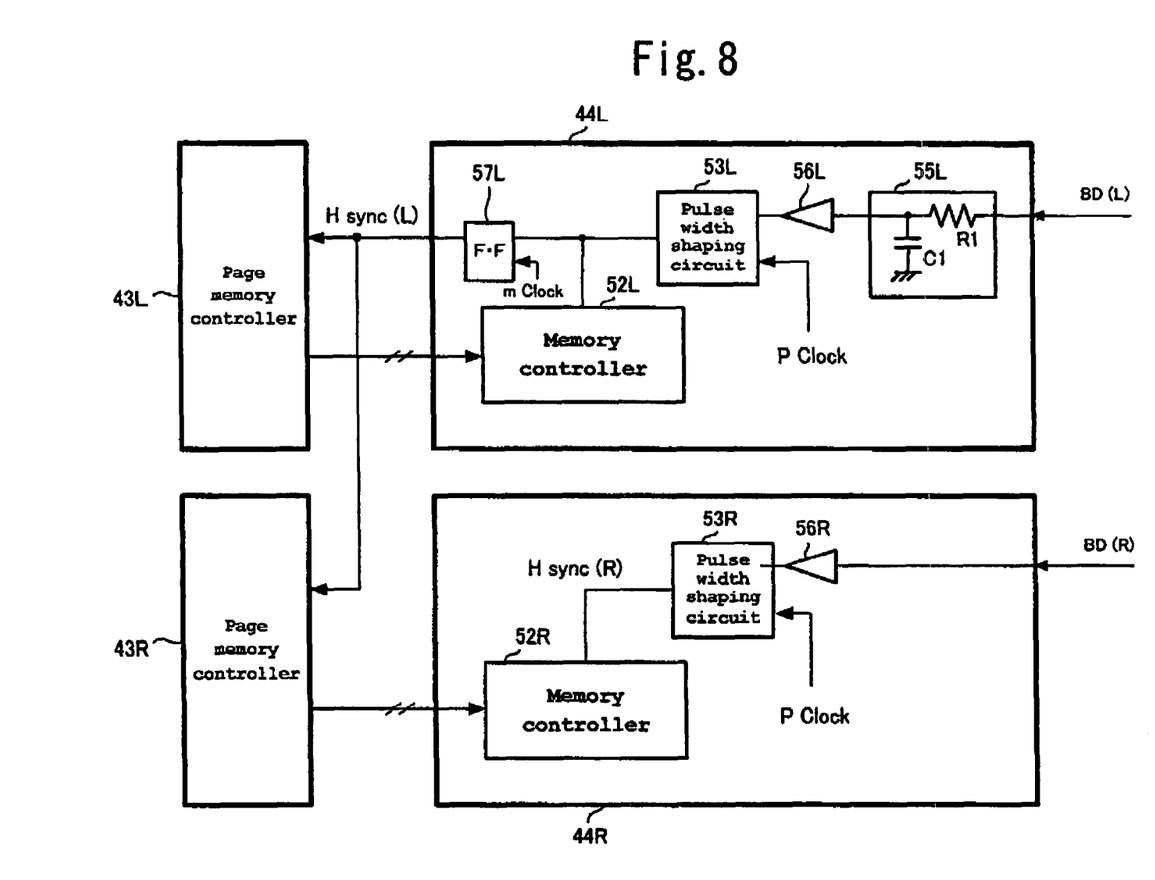
FIG. 8 is a block diagram for explaining an image processor of an image forming apparatus according to another embodiment of the present invention.

FIG. 8 shows the main part of the laser control units 44L, 44R. The laser control unit 44L inputs detection signal BD (L) from the sensor 19L to a Schmitt buffer 56L through a time constant circuit 55L constituted by a resistor R1 and a condenser C1, allows the time constant circuit 55L to integrate detection signal BD (L), outputs it through the Schmitt buffer 56L to delay the detection signal BD (L), and inputs the delayed detection signal BD (L) to the pulse width shaping circuit 53L.

The laser control unit 44R inputs detection signal BD (R) from the BD sensor 19R to the pulse width shaping circuit 53R through the Schmitt buffer 56R. Other components are the same as those shown in FIG. 5.

In this example, synchronization signal H sync (L) generated based on the delayed detection signal BD (L) is supplied, as a reference signal, to the page memory controllers 43L, 43R. Accordingly, the phase of synchronization signal H sync (R) is always advanced relative to the phase of synchronization signal H sync (L), so that sampling of image data is performed at the timing shown in FIGS. 6C and 6E. Thus, sampling time period R sampling precedes L sampling by time .DELTA.t and data writing into the line buffer memory 51R is started at a slightly earlier timing. By providing the adequate time constant circuit 55L, it is thus possible to prevent the sampling timing from being shifted by about one line as shown in FIG. 7(e).

Although the time constant circuit 55L and Schmitt buffer 56L are used as a delay means, it is possible to use any delay circuit as long as it can set delay time such that the phase of synchronization signal H sync (R) is always advanced relative to the phase of synchronization signal H sync (L) serving as a reference signal. However, if the delay time is too large, the shift substantially corresponding to one line may occur as shown in FIG. 7(e). Therefore, phase difference At needs to be set to an adequate value. For example, a counter circuit that uses clock signal (P Clock) to delay time corresponding to several clocks may be adopted. As clock signal (P Clock), clock signal of about 50 MHz is used.

As described above, according to the image forming apparatus of the present invention, in the case where the polygon mirror is used to simultaneously generate a plurality of laser beams to perform exposure scanning operation for the photoconductor drums, it is possible to suppress so called line misalignment in writing process of the laser beams onto the photoconductor drums to thereby prevent image degradation.

In the above description, the phase of synchronization signal H sync (R) is advanced relative to the phase of synchronization signal H sync (L) and synchronization signal obtained based on detection signal BD (L) from the BD sensor 19L is supplied to the page memory controllers 43L, 43R. Alternatively, however, synchronization signal obtained based on detection signal BD (R) from the BD sensor 19R may be supplied to the page memory controllers 43L, 43R.

Further, whether the phase of synchronization signal H sync (R) or H sync (L) is advanced is not an essential problem. The phase of synchronization signal H sync (L) may be advanced relative to the phase of synchronization signal H sync (R). The point is that the time-base relation between synchronization signals H sync (R) and H sync (L) is not allowed to be changed.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

It is claimed:

1. An image forming apparatus that controls a plurality of laser beams based on image data of different colors and performs an exposure scanning operation for a photoconductor drum to form an image, comprising:
   first and second laser source sections that irradiate a polygon mirror with laser beams from different directions;
   first and second light scanning sections that allow the polygon mirror to reflect the laser beams from the first and second laser source sections toward different optical axis directions to scan the laser beams at a predetermined deflection angle;
   a first beam detector that is disposed at the beam incident end in the scanning direction of the first light scanning section and receives a first laser beam to detect the start of the scanning; and
   a second beam detector that is disposed at the beam incident end in the scanning direction of the second light scanning section and receives a second laser beam to detect the start of the scanning at an earlier timing than the first beam detector does;
   wherein a distance between the first beam detector and the first light scanning section and a distance between the second beam detector and the second light scanning section are different.

2. The image forming apparatus according to claim 1, further comprising:
   a laser controller that utilizes the detection result of the first beam detector to set sampling start timing in common between first and second image data, writes the first and second image data in a memory based on the detection results of the first and second beam detectors, and controls the first and second laser source sections based on the image data read out from the memory,
   wherein the first and second beam detectors are disposed at an overscan region which is a region out of the scan region in which the photoconductor drum is exposed for forming an image such that the second beam detector receives the second laser beam at an earlier timing than the first beam detector receives the first laser beam.

3. The image forming apparatus according to claim 1, wherein
   the polygon mirror has upper and lower mirror surfaces, and
   the first and second laser source sections have a plurality of laser sources that are vertically arranged and project laser beams of different colors on the mirror surfaces of the mirror, the laser beams running in parallel to each other.

4. The image forming apparatus according to claim 1, further comprising:
   a synchronization signal generation circuit that generates first and second synchronization signals corresponding to the first and second laser beams respectively based on the detection result of the first and second beam detectors,
   wherein sampling start timing is set in common between the first and second image data based on the first synchronization signal, and first and second image data are written in a memory based on the first and second synchronization signals.

5. The image forming apparatus according to claim 1, wherein
   the image forming apparatus is a tandem type image forming apparatus that has a plurality of photoconductor drums to be exposed by laser beams emitted from the plurality of laser sources.

6. An image forming apparatus that controls a plurality of laser beams based on a corresponding plurality of image data of different colors and performs an exposure scanning operation for a photoconductor drum to form an image, comprising:
   means for detecting a reference point for main scanning operation of first and second laser beams with corresponding first and second beam detectors and generating first and second synchronization signals corresponding to the respective first and second laser beams in order to control timing of the exposure scanning operation performed using the laser beams;
   means for allowing the second synchronization signal to be advanced relative to the first synchronization signal;
   a memory controller that utilizes an enable signal generated based on the first synchronization signal to set sampling start timing of the plurality of image data and writes the plurality of image data into a memory based on the corresponding synchronization signal; and
   laser control means for modulating each of the plurality of laser beams based on the corresponding image data that has been read out from the memory controller;
   wherein a first distance between the first beam detector and a corresponding first reflection mirror and a second distance between the second beam detector and a corresponding second reflection mirror are different.

7. The image forming apparatus according to claim 6, wherein
   the means for allowing the second synchronization signal to be advanced relative to the first synchronization signal is constituted by a delay circuit that delays the first synchronization signal serving as a reference signal relative to the second synchronization signal.

8. The image forming apparatus according to claim 6, wherein
the laser control means includes a plurality of PWM circuits that pulse-width modulate respective laser beams based on the corresponding image data that has been read out from the memory controller.

* * * * *